United States Patent [19]

Moss

[11] 4,259,088
[45] Mar. 31, 1981

[54] DISTRIBUTING FLUIDS INTO FLUIDIZED BEDS

[75] Inventor: Gerald Moss, Oxford, England

[73] Assignee: The United States of America as represented by the Administrator of the Environmental Protection Agency, Washington, D.C.

[21] Appl. No.: 881,980

[22] Filed: Jan. 16, 1978

Related U.S. Application Data

[63] Continuation of Ser. No. 625,619, Oct. 29, 1975, abandoned.

[30] Foreign Application Priority Data

Oct. 31, 1974 [GB] United Kingdom ............... 47152/74

[51] Int. Cl.³ ........................... B01J 8/18; B01J 8/22; C01B 2/14; F27B 15/00
[52] U.S. Cl. ..................... 48/212; 34/57 A; 48/107; 422/141; 422/142; 422/143; 423/244; 431/7; 431/170; 432/58
[58] Field of Search ........................ 48/107, 212, 128; 423/DIG. 16, 244 A, 168; 422/143, 139, 142, 141; 208/213, 226; 431/170, 7; 110/28 J; 432/15, 58, 14; 34/57 A

[56] References Cited

U.S. PATENT DOCUMENTS

| | | |
|---|---|---|
| 2,668,041 | 2/1954 | Knibbs ............................... 34/57 A |
| 2,853,370 | 9/1958 | Downing ............................ 432/58 X |
| 2,976,853 | 3/1961 | Hunter et al. . | 
| 3,397,657 | 8/1968 | Tada . |
| 3,508,341 | 4/1970 | Price ................................. 432/58 X |
| 3,772,999 | 11/1973 | Miller, Jr. et al. .................. 110/8 R |
| 3,914,089 | 10/1975 | Desty ............................... 431/170 X |
| 3,915,657 | 10/1975 | Staffin et al. ...................... 432/58 X |

FOREIGN PATENT DOCUMENTS

| | | |
|---|---|---|
| 582360 | 9/1959 | Canada ............................. 423/DIG. 16 |
| 1336563 | 11/1973 | United Kingdom . |
| 1339287 | 11/1973 | United Kingdom ..................... 431/170 |

Primary Examiner—Irwin C. Cohen

[57] ABSTRACT

A distributor for distributing a fluid into the volume of a fluidized bed contained in a vessel comprises a base member in which are mounted upstanding nozzles having outlets for directing the fluid horizontally away from the nozzles into the volume of the bed, the outlets of some nozzles being arranged at a lower level than the outlets from other nozzles so that fluidizable bed material will be fluidized above a contour substantially defined between the outlets of the nozzles. Thus, there will be a "well" or depression in the countour around each nozzle, and the countour will extend to just below the outlet of each nozzle. The contour may be formed by the upper surface of unfluidized fluidizable material (e.g., from the bed) or by the upper surface of non-fluidizable material (e.g. blocks of refractory cement or metal sheeting) which may constitute at least part of the base member. Another fluid may be passed into the volume of the fluidized bed by providing conduits which extend horizontally beneath the countour (e.g. for protection from the fluidized bed) except for one end which extends into the volume of the wells or depressions. The other end is preferably outside the distributor and the conduits are preferably straight and withdrawable from the distributor.

15 Claims, 4 Drawing Figures

DISTRIBUTING FLUIDS INTO FLUIDIZED BEDS

The invention described herein was made in the course of, or under, a contract with the U.S. Environmental Protection Agency.

This is a continuation of application Ser. No. 625,619, filed Oct. 24, 1975, now abandoned.

The present invention relates to the distribution of fluids into beds of fluidizable solids ("fluid-solids beds").

It is a common practice in the field of fluid-solids bed technology to fluidize the solids by at least one upwardly-passing fluid which enters the bed at the bottom, e.g., via a fluid distributor, and to pass any other fluid or fluids into the bed from conduits extending from the side of the bed. Since lateral fluid mixing within a fluid-solids bed tends to be poor, the conduits must extend into the bed various distances to ensure that the said other fluid(s) is (or are) initially fairly well dispersed therein. If the fluid-solids bed operates at relatively high temperatures, the conduits and their contents are exposed to the relatively high temperature and tend to deteriorate as a result. If the bed operates at a low temperature, heat loss through the conduit wall to the bed may cause problems in satisfactorily flowing the other fluid(s) since if this is a liquid, its viscosity will increase and it is even possible that at least partial solidification may take place. Moreover, the conduit is exposed within the bed to the erosive and possibly corrosive environment within the bed.

In one aspect, the present invention provides a fluid distributor for distributing a fluid into a fluid-solids bed comprising an array of upstanding fluid distribution nozzles, the fluid outlets from which are at two or more selected different heights such that during operation, the bottom of the fluid-solids bed will have a substantially predetermined contour defined by a surface substantially defined between the fluid outlets. The fluid outlets are preferably so arranged that the contour of the bottom of the fluid-solids bed has a number of downward depressions therein, each depression surrounding a fluid outlet at a height below at least one other fluid outlet. The downward depressions may be of substantially circular horizontal cross-sections, or they may be of channel or trench-like form. The latter shape may be obtained by arranging the outlets of adjacent nozzles in a line at substantially the same height below the maximum outlet height from other nozzles, and sufficiently close together that, in effect, the circular depression around each nozzle merges into the circular depression around the next nozzle in the line. Below the level of the outlets, there may be non-fluidized or "slumped" fluidizable solids or non-fluidizable material. The non-fluidizable material may comprise one or more sheets of metal having the said contour or one or more blocks of refractory material which may be in the form of discrete members which are fitted together, cementitious material or naturally occurring stone or rock suitably shaped to have the required contour.

The fluid discharge outlets from the nozzles preferably direct fluid substantially horizontally outwardly from the distribution nozzles. Preferably the nozzles which discharge fluid at the, or a, greater height have a higher resistance to fluid flow therethrough than the nozzles which discharge fluid at a, or the, lower height so that fluid distribution into the bed is relatively uniform per unit volume of the bed.

The invention also provides, in another aspect, a vessel for containing a bed of fluidized solids, having a fluid distributor as described above for supporting the bed.

Means may be provided for passing another fluid (which may be a liquid and/or a gas, optionally containing suspended dispersed solid material) into the volume of the fluidized part of the bed within or above the location of the said depressions in the bottom contour of the bed. The said means may be one or more conduits extending through the non-fluidized or non-fluidizable material so that the conduits, and their contents (apart from the ends at the locations of the depressions) are protected from the fluidized part of the bed during operation. Thus, if the fluidized bed should operate at high temperatures and/or contain substances which might corrode and/or erode the material of the conduit, the protection afforded by the non-fluidized parts between the depressions in the bottom of the fluidized bed prevents deterioration of the conduits, and enables these to be made from a wider range of materials. Moreover, the contents of the conduits are protected from the conditions in the fluidized bed, so that deterioration of the contents due to exposure to high temperatures, or difficulties in passing the contents through the conduits due to increased viscosity, or solidification, from exposure to low temperatures is substantially avoided.

The or each conduit may be substantially straight thereby facilitating internal cleaning by rodding out, scraping, etc. The conduit(s) may extend substantially horizontally from the side of a containing wall of the fluid-solids bed. The arrangement of protected, substantially straight, substantially horizontal conduits is particularly advantageous in beds which are relatively extensive horizontally, and avoids the problems associated with prior proposals in which fluids are passed into fluidized beds from conduits which are exposed to the beds over a substantial part of their length. Moreover, the invention provides that conduits may be arranged to pass fluid into the bed at substantially any desired position, and the position of entry of fluid into the bed may be varied, provided at least part of the conduit(s) and of the bottom of the bed is movable, to suit bed operating conditions and/or changes in the fluid passed through the conduit(s) etc., in order to optimize bed operation.

In a further aspect, the invention provides a vessel for use in at least partial combustion of a fuel in a fluidized bed comprising a lateral wall for laterally containing the fluidized bed, a distributor extending across the base of the vessel, the distributor comprising an array of upstanding nozzles having fluid outlets for directing fluid laterally into the volume of the fluidized bed, the fluid outlets of some nozzles being at a lower level than the fluid outlets of other nozzles whereby there will be substantially no fluidization in the vicinity of the fluid outlet of the, or a respective, nozzle at the lower level the conduit otherwise extending below the volume of the fluidized bed, whereby, during operation a fuel can be injected into the fluidized bed from the, or each, conduit in the vicinity of the fluid outlet of a respective nozzle at the lower level.

The vessel may have an upstream region for the entry of fluidizable particles into the volume of the fluidized bed, a downstream region for the exit of particles from the volume of the fluidized bed, and at least one baffle extending partly across the volume of the bed to cause particles to follow a serpentine course in the bed from the upstream region to the downstream region. The vessel may further comprise a zone for receiving at one end particles from the downstream region of the volume of the fluidized bed and arranged, at another end, for the passage of particles to the upstream end of the volume of the fluidized bed, the zone being adapted for conversion of at least some particles to a form in which they are used in the fluidized bed. The said zone is preferably adopted to fluidize particles therein during operation of the conversion step.

The invention is illustrated by reference to non-limitative examples thereof, and by reference to the drawings in which.

Figure 1:
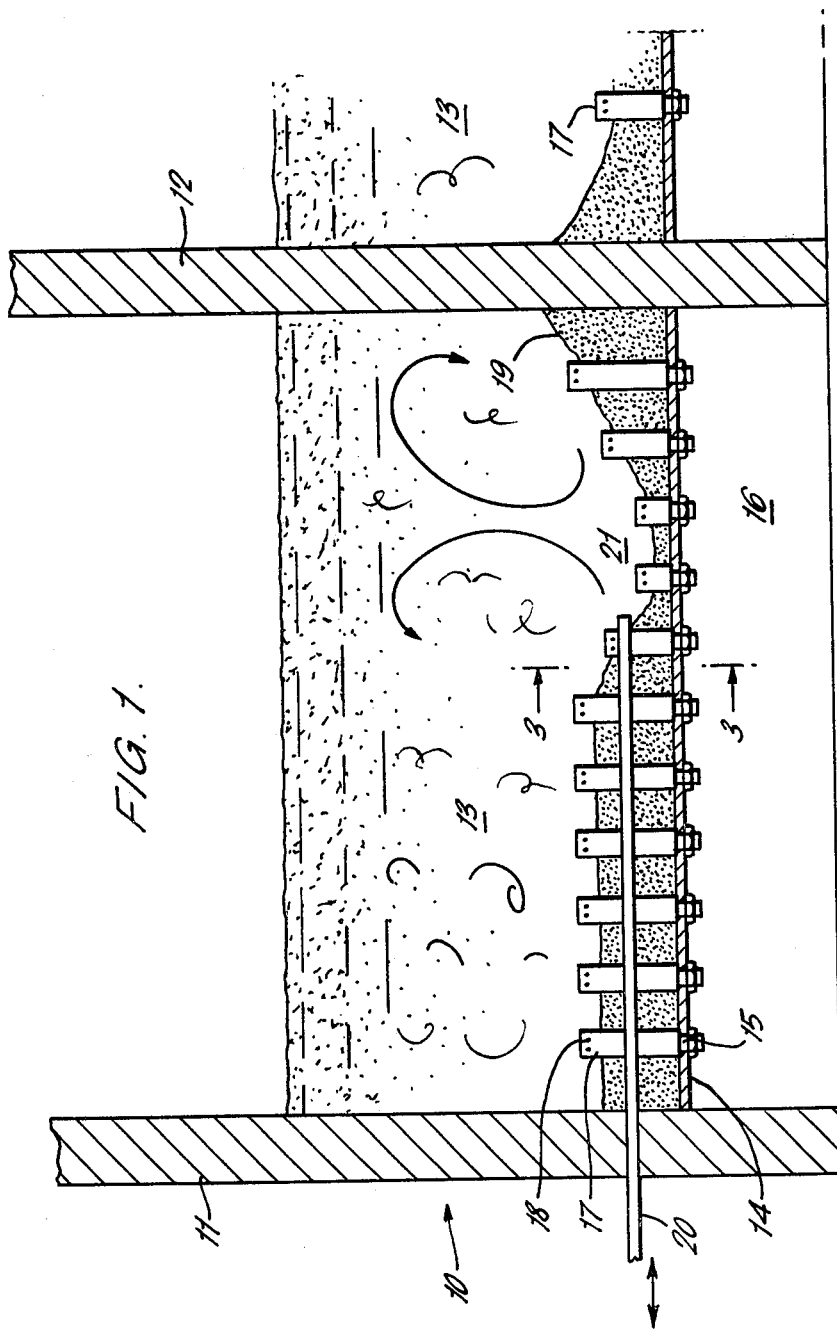
FIG. 1 is a schematic vertical cross-section through a fluidized bed fuel gasifier.

The gasifier 10 comprises side walls 11 and 12 for laterally confining a bed 13 of fluidizable material, in this instance, particles of lime, a central wall 12 partly dividing the bed 13 into two substantially equal communicating parts, the bed being supported on a metal plate 14 having a number of orifices 15 therethrough. The plate 14 has a space 16 beneath, to which air is supplied. Above the plate 14, and secured thereto, are a number of upstanding air distribution nozzles 17 arranged to receive air from the orifices 15. The nozzles 17 are generally in the form of substantially vertical tubes, open to the orifices 15 at the lower end, but closed at the top end, each tube having a number of substantially radial orifices 18 near the top end for directing air into the bed 13 substantially horizontally. The nozzles 17 may be of the form disclosed in UK patent specification 1396588.

It will be seen that the nozzles 17 extend to different heights, and it will be appreciated that the horizontally directed air from the radial orifices 18 will only fluidize those lime particles upwardly from approximately the level of each orifice 18. Accordingly, particles below the level of the orifices 18 will be non-fluidized or slumped and thereby define the contour, referenced 19 in the drawing, of the bottom of the fluidized bed 13.

A substantially straight, substantially horizontal, fuel injection pipe 20 extends through the lateral wall 11 and across a substantial proportion of the width of the bed below the contour 19 into the downwardly extending part or well 21 of the fluidized bed 13 above the radial orifices of some of the nozzles 17. Fuel oil is passed through the pipe 20 into the well 21 of the bed 13 wherein it mixes with air and is converted to fuel gas. Any sulphur in the fuel oil may be removed at least in part by reaction with the lime in the lime particles to form calcium sulphide.

The conversion to fuel gas is preferably performed under such conditions as to be exothermic and thereby self-sustaining, and the temperature of the bed 13 is preferably about 870° C. for maximum sulphur-fixing activity and optimum conversion to fuel gas.

The oil in the pipe 20 is relatively insulated from the high temperatures in the fluidized bed 13 by the slumped particles beneath the contour line 19, and problems arising from degradation of the oil by heat are thereby substantially obviated. Similarly, the pipe 20, being protected by slumped material, is less likely to be damaged by heat or chemical or physical corrosion or erosion and its life is substantially increased, or it may be made from less heat resistant materials. Since the pipe 20 is straight, internal cleaning is facilitated, and it may also be withdrawn relatively simply for servicing and/or replacement by movement in its axial direction through the lateral wall 11.

Figure 2:
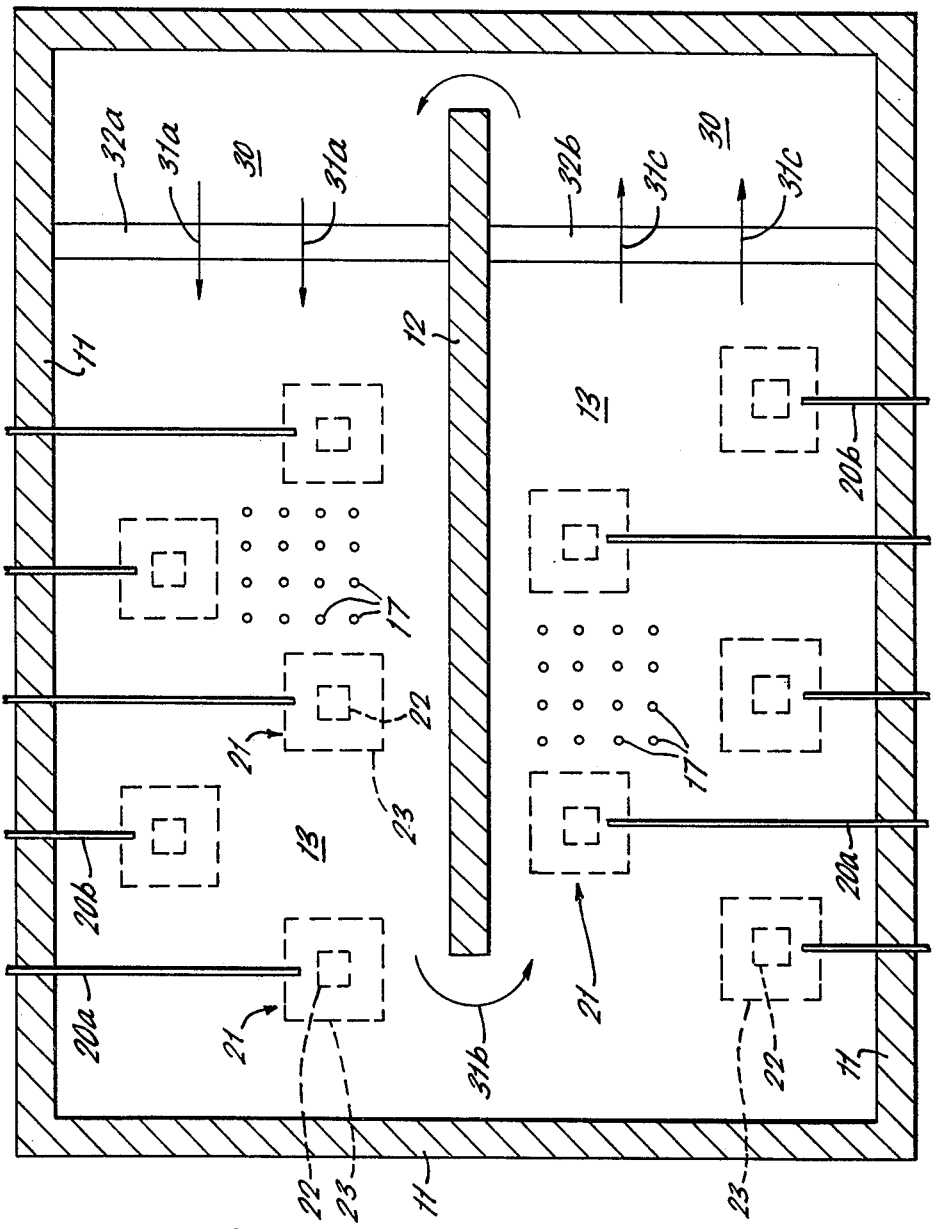
FIG. 2 is a schematic plan view of part of the gasifier of FIG. 1.

In FIG. 2 are shown the respective approximate interior and exterior contours 22, 23 of a number of wells 21, with fuel oil injector pipes 20a, 20b, etc. extending through slumped parts of the bed 13 into the wells 21. The nozzles 17 are indicated only in part of the bed 13. In FIG. 2 although it will be appreciated that nozzles 17 are located in a substantially uniform array over the whole plan area of bed 13.

In the drawings, the region 30 may be a further part of the gasifier 10, the particles flowing around the wall 12 from an upstream part of the bed 13 adjacent to region 30, as indicated by the arrows 31a and 31b to a downstream part adjacent to region 30 as indicated by arrows 31c. The region 30 preferably comprises a regenerator for releasing chemically-fixed sulphur from the lime particles in the manner disclosed in U.K. patent specification Nos. 1183937 and 1336563. In this latter type of embodiment, means would be provided for promoting and regulating the flow of particles between the bed 13 and the region 30 as disclosed, for example, in U.K. patent specification No. 1336563. Such flow-regulating and promoting means would be incorporated between the bed 13 and region 30, preferably in wall parts 32a and 32b respectively at the upstream and downstream ends of the bed 13.

In the case where the region 30 is employed as a regenerator, the CaS-containing particles from bed 13 are fluidized by an oxygen-containing gas (e.g. air) under controlled conditions to convert CaS to CaO with the liberation of $SO_2$. The oxygen-containing gas may be injected through nozzles of the same type as those used in bed 13, and in the instance where it might be desired to introduce a substance (e.g. a fuel) into the vicinity of the nozzles, the substance may be introduced through straight conduits extending from an outside wall of the region 30 to the vicinity of some nozzles which have their outlets at a lower level than the level of the outlets of other nozzles, as has been described above in relation to the arrangement and operation of bed 13.

It may be preferred, when the fuel is a solid such as coal, to provide suitable baffles extending across the gasifier bed 13 to cause particles circulating from one end of the bed to the other to follow a serpentine path to avoid "short-circuiting" of particles is substantially straight lines between the upstream and downstream ends of the bed.

While in the embodiment as shown in FIG. 1, the contour 19 of the bottom of the fluidized bed 13 is formed by non-fluidized fluidizable particles, it is within the ambit of the invention that the contour 19 can be formed, at least in part, by non-fluidizable material disposed between the metal plate 14 and the intended volume of the fluidized bed 13. A suitable non-fluidizable material for use in a gasifier is refractory cement which is provided as interfitting blocks having a flat base to rest on the metal plate 14 and an upper surface which is shaped to provide the desired contour, there being vertical holes therethrough in which the nozzles 17 are removably received and horizontal holes for the fuel injection pipe(s) 20. As viewed in vertical cross-section, the refractory cement would have substantially the same form as the non-fluidized particles shown in FIG. 1. The thickness of the refractory cement preferably should not be less than one inch, and more preferably about 2 inches. The maximum depth of the wells 21 is preferably about 5 to 6 inches.

Figure 3:
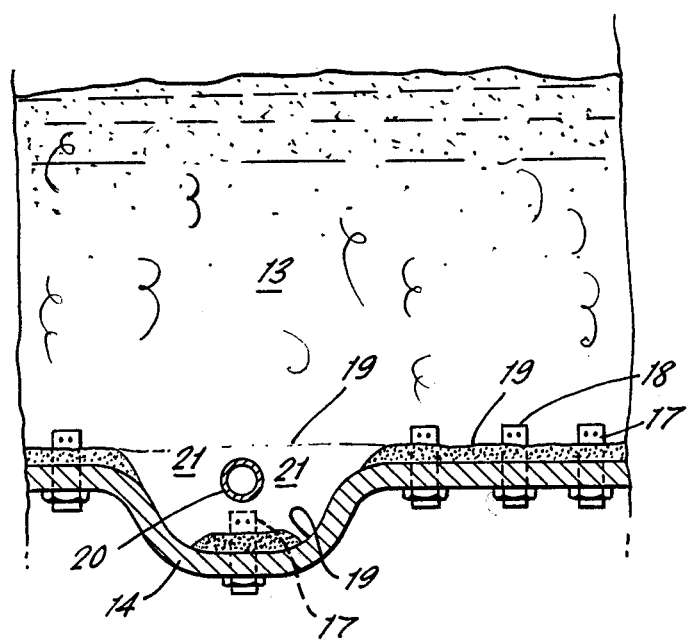
FIG. 3 shows, in a vertical cross-section corresponding to that of 3—3 in FIG. 1, another embodiment of the distributor according to the invention.

In the embodiment illustrated in FIG. 3, the plate 14 is itself formed with depressions, and some nozzles 17 are fitted into the plate 14 outside the depressions so that their outlet orifices 18 are above the depressions, while other nozzles 17 are fitted into depressions of the plate with their outlet orifices 18 below the level of the orifices 18 outside the depressions. When air is passed through the nozzles 17, the bottom contour 19 of the volume of the fluidized bed 13 is substantially defined by a surface extending just below the level of the outlet orifices 18. To prevent damage to the plate 14, the outlet orifices 18 are preferably located about 2 inches above the plate, so that about 2 inches of non-fluidized fluidizable particles deposit on the plate. Fuel is injected into the well 21 laterally defined by the depressions in the plate 14 via a fuel injection pipe 20 and mixes with the air passing out of the orifices 18 of the nozzle 17 in the fluidized part of the bed in the well 21 where at least some part-combustion of the fuel occurs.

Figure 4:
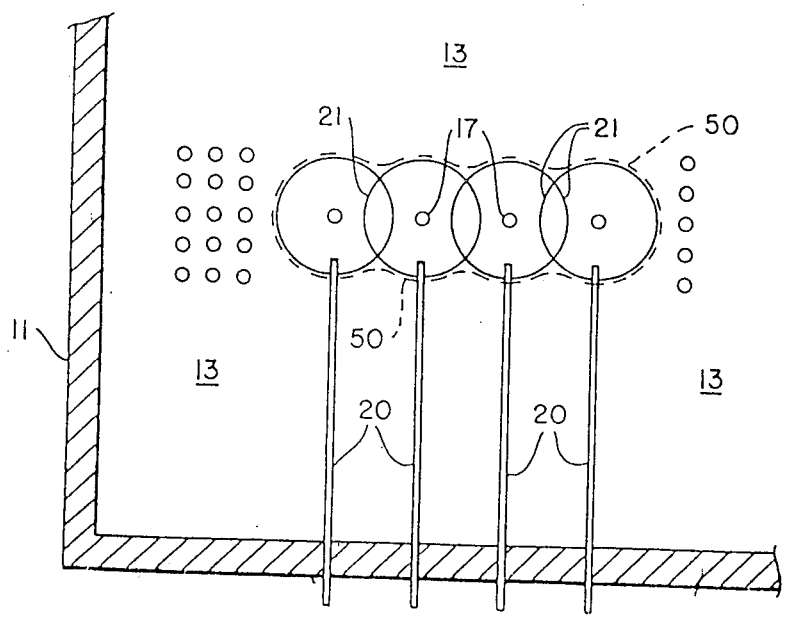
FIG. 4 is a schematic plan view of another arrangement of part of the gasifier of either FIG. 1 or FIG. 2.

Whichever of the materials herein referred to is employed to define bottom of the fluidized bed, it will be appreciated that the wells around each nozzle 17 at the lower level are of substantially circular shape in horizontal cross-section. If a number of adjacent nozzles 17 are sufficiently close together, the circular wells merge, and if the adjacent nozzles 17 at the lower level are in a straight line, the resultant well will be of channel-like or trench-like form as indicated by broken line 50 in FIG. 4. Such a form is advantageous in some instances for relatively intense partial combustion when the fuel injection is from substantially straight pipes 20, and from the point of view of reducing the size of the gasifier, intense part-combustion is advantageous.

The invention has heretofore been particularly described to its use in the part-combustion of fuels in fluidized beds. However, it is to be understood that the invention may be applied, inter alia, to the complete combustion of fuels, adequate oxygen-containing gas being supplied via the nozzles 17 to burn the fuel in the bed. In the case of complete combustion of fuels where the fuel contains sulphur, and the particles of the fluidized bed contain a sulphur-fixing agent such as CaO, the sulphur of the fuel tends to be fixed in the particles as $CaSO_4$, and CaO can be recovered from this by reduction in the zone 30 as described in U.K. patent specifications Nos. 1183937 and 1336563. Since the reduction of $CaSO_4$ to CaO is preferably performed by fluidizing the $CaSO_4$-containing particles in an oxygen-containing gas and providing fuel in excess of that which can be completely burned by the oxygen in the zone 30, it may be preferred that the arrangement of the distributor for the oxygen-containing gas and the fuel injection pipes in the zone 30 be in accordance with the invention and substantially as illustrated in FIGS. 1 and 2 or FIG. 3.

Although in the foregoing description, the fuel employed is a fuel oil, it is to be understood that gaseous and solid fuels may also be used. Thus, the fuel may be a sulphur-containing fuel gas, or a solid fuel such as coal. In the latter case, the solid fuel is suitably comminuted and carried into the fluidized bed by a gas or liquid. A suitable gas may be air or flue gas or steam and a suitable liquid may be a fuel oil in which the solid fuel is slurried.

We claim:
1. A fluidized bed apparatus comprising:
   (a) a vessel having an interior space defined by vertical wall means;
   (b) a bed of particulate material contained within said vessel;
   (c) means for supporting said bed of particulate material within said interior of said vessel, said support means being provided with a plurality of openings for introduction of a fluidizing fluid into the bed, said support means spanning said vertical wall means in a generally horizontal plane;
   (d) nozzles mounted on and extending vertically from the upper surface of said support means, each of said nozzles communicating with one of said openings to provide a flow passage for the fluidizing fluid, a first plurality of said nozzles having outlets in a horizontal plane above said upper surface of said support means and above a horizontal plane defined by the outlets of a second plurality of nozzles and laterally spaced therefrom, said nozzles cooperating to fluidize the particulate material above the outlets of said nozzles along a continuous contoured interface between the fluidized particulate material and unfluidized particulate material or non-fluidizable material forming part of said support means, said contoured interface having a plurality of structurally noncommunicating, separate and distinct depressions laterally spaced in a horizontal plane; and
   (e) at least one conduit for introducing a second fluid, said conduit extending generally horizontally within the interior of the vessel, the length of said conduit running above the outlets of said second plurality of nozzles, above the support means and below the outlets of said first plurality of nozzles, the terminus of said conduit being located at a position laterally spaced between the vertical walls spanned by said bed support means and between nozzles of said first and second pluralities and protruding into a depression normally occupied by fluidized material.

2. The apparatus of claim 1 further comprising means for mounting the conduit for movement in its axial direction thereby enabling the point of injection of the second fluid within a bed to be varied.

3. The apparatus of claim 1 wherein said support means is contoured to define a plurality of depressions at the identical locations of said contoured interface depressions.

4. The apparatus of claim 1 wherein said support means is formed of a material selected from the group consisting of metal sheet, refractory materials, cementitious materials and naturally-occurring stone.

5. The apparatus of claim 1 wherein a portion of said second plurality of nozzles are arranged in a straight line so that in operation the fluidizing gas forms at least one trench or channel-shaped depression in said contoured interface.

6. The apparatus of claim 1 wherein each of said first plurality of nozzles have a higher resistance to fluid flow than the nozzles of said second plurality.

7. The apparatus of claim 1 comprising a plurality of conduits for introduction of the second fluid into the bed, the entire length of each of said conduits extending above said upper surface of said support means and through an area normally occupied by an unfluidized portion of particulate material, each of said conduits terminating at a different depression in said contoured interface normally occupied by fluidized particulate material.

8. The apparatus of claim 1 further comprising means for dividing the vessel into upstream and downstream regions and at least one baffle extending partly across the vessel to cause particles to flow a serpentine course in the vessel from the upstream region to the downstream region.

9. A process for gasification of a liquid using the apparatus of claim 1 comprising the steps of:
 (a) heating said bed to a temperature sufficient to gasify the liquid; and
 (b) introducing the liquid as said second fluid into the bed at a point within one of said depressions.

10. The process of claim 9 wherein said liquid is introduced into the bed at two or more points within said depressions.

11. The process of claim 9 wherein said liquid is introduced into the bed through at least one conduit extending through an unfluidized portion of the particulate material whereby the unfluidized portion insulates the liquid within the conduit.

12. The process of claim 9 wherein said liquid is a sulphur-containing fuel and the particulate materials contains a sulphur-mixing agent.

13. The process of claim 12 wherein said sulphur-fixing agent is CaO.

14. The apparatus of claim 1 wherein said one conduit extends through an area of said vessel normally occupied by an unfluidized portion of the particulate material whereby the unfluidized bed material insulates the conduit.

15. The fluidized bed apparatus of claim 1 wherein said continuous contoured interface is between the fluidized particulate material and non-fluidizable material forming part of said support means.

* * * * *